(No Model.)

J. A. WHITE & J. W. MOORE.
CLUTCH.

No. 363,707. Patented May 24, 1887.

WITNESSES:

INVENTOR

UNITED STATES PATENT OFFICE.

J. ATWOOD WHITE AND JOHN W. MOORE, OF PHILADELPHIA, PENNSYLVANIA.

CLUTCH.

SPECIFICATION forming part of Letters Patent No. 363,707, dated May 24, 1887.

Application filed December 27, 1886. Serial No. 222,717. (No model.)

*To all whom it may concern:*

Be it known that we, J. ATWOOD WHITE and JOHN W. MOORE, both citizens of the United States, residing at Philadelphia, in the county of Philadelphia and State of Pennsylvania, have invented certain new and useful Improvements in Friction-Clutches; and we do hereby declare the following to be a sufficiently full, clear, and exact description thereof as to enable others skilled in the art to make and use the said invention.

This invention relates to clutches for engaging and disengaging shafts, pulleys, and gear-wheels for transmitting rotary motion with and from each other, and has for its object the greater facility and promptness of engagement and disengagement, the avoidance of friction and wear upon the parts connecting the coupling with the operating lever or handle, simplicity and cheapness of construction, and ready facility for compensating for wear in the frictional surfaces engaged in transmitting motion.

The nature of this invention, to effect these results, consists in a circular disk having flat surfaces, secured so as to turn with the portion of machinery to be turned intermittently, placed between a plate secured upon the constantly-turning shaft, and a rim drawn toward the plate by bolts passing through both of them, and an angle-lever of peculiar form and operated by a toggle worked by a sleeve sliding upon the shaft, and moved by means of collars formed thereon connected to a lever or handle. The bolts are provided with nuts, by which their operative length is readily adjusted and wear compensated thereby.

We will now proceed to particularly describe the construction and operation of this invention, referring in so doing to the drawings annexed and the letters of reference marked thereon.

Figure 1:
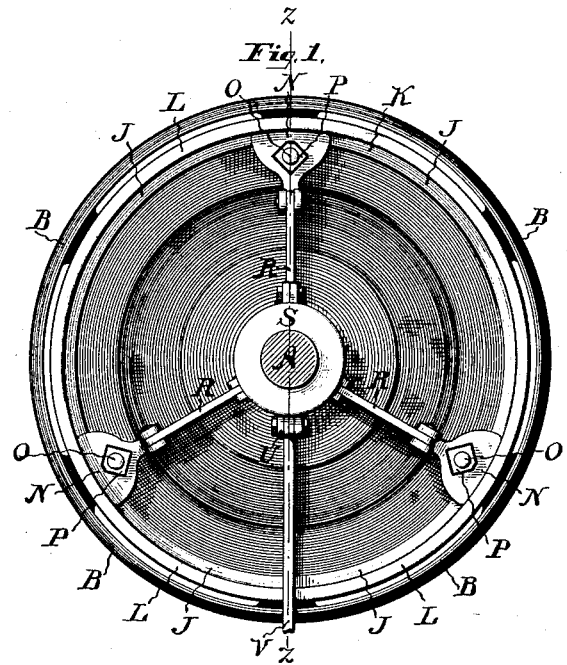
Figure 2:
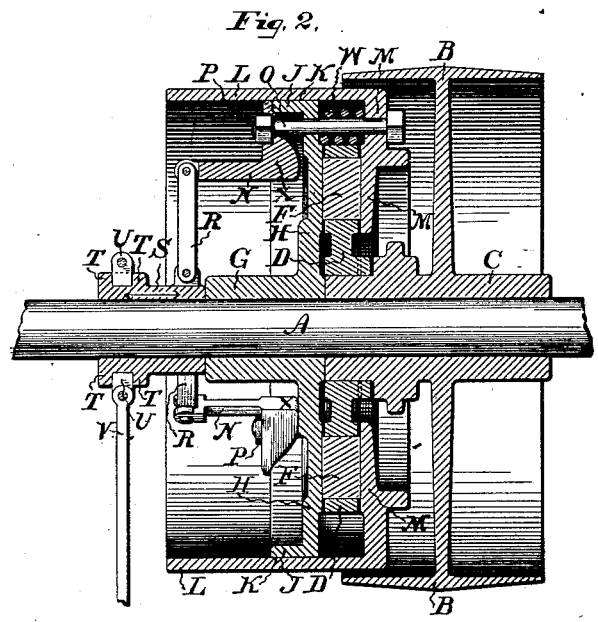

Figure 1 is an end view of a shaft and a pulley with this coupling applied, and Fig. 2 is a section of the same in the plane indicated by the dotted line *z z* in Fig. 1.

The same letters of reference apply to the same parts in the several figures.

A represents a cylindric shaft; B, a pulley having its hub C fitted so as to turn freely thereon.

D is a disk of circular form, fitted on the hub C so as to turn therewith, and it may advantageously have sufficient play to vibrate or rock slightly thereon, so as to adapt it without strain to accidental inaccuracies in its construction. Through mortises formed therein are plugs of wood F, presenting their end-grain on the flat surfaces of the disk D.

G is a hub securely fastened upon the shaft A and turning therewith, having a flange, H, opposed to the side of the disk D, and a rim, J, rounded upon the edge and cylindric on its circumference K. Fitting upon the circumference K of the flange H, so as to slide freely thereon without shaking, is a rim, L, having a flat inwardly-projecting flange, M, with its surface opposed to one of the flat sides of the disk D. Through the flange M and flange H, and also through angle-levers N, are holes, through which bolts O pass, provided with nuts P, by which their operative length is adjusted.

The angle-levers N rest with one arm on the rim J of the flange H, and have bearings formed in them as close to the rim J as practicable, in which the heads of the bolts O or the nuts P thereon rest without fitting tightly. The other arms of the levers N are attached pivotally to the ends of the links R, the opposite ends of which links R are pivotally attached to a sleeve, S, fitted to slide upon and turn with the shaft A, and provided with collars T T, between which a collar, U, fits, pivotally attached to a lever, V, by means of which the sleeve S may be made to slide lengthwise on the shaft A in the direction of the double headed arrow marked on the sleeve S in Fig. 2.

The proportions of the links R, sleeve S, and levers N and bearings thereof on the rim J are such that the central lines or planes of axes of the pivots of the links R may be brought into coincidence with each other, and when in this position there is no reaction or transmission of force through the links R tending to move the sleeve S lengthwise upon the shaft A, and under this condition there is no pressure of either of the collars T upon the ring U, and consequently no friction from this source.

The lines of bearing of the levers N upon the rim J are so near to the lines of bearing of the heads of the bolts O or the nuts P that a very powerful leverage is afforded upon the bolts O, drawing the flange M against the disk D and the disk D against the flange H and securely clamping them together, with but very slight motion of the bolts O in the holes in the flange H and flange M, the motion being so slight that the bolts O serve to transmit the rotary motion of the flange H to the flange M, levers N, links R, and sleeve S without any other device for that purpose. When clamped in the manner described, the flange H imparts rotary motion to the disk D and hub C and pulley B without reacting and causing friction upon the collars T T and U. By sliding the sleeve S away from the hub G, by means of the lever V, ring U, and collars T T, the links become oblique to each other, and the arms of the levers N therewith connected are drawn toward the hub G, the bolts O are loosened, and the disk D, no longer clamped to the flange H, ceases to receive motion therefrom.

From the great pressure at command, by small exertion on the part of the operator with this mechanism small and inexpensive sizes of such couplings are efficient in transmitting large amounts of power, and by reason of the simplicity of form and construction of parts, the entire fitted surfaces being produced by turning and drilling, a very cheap and efficient coupling results by this invention; and since there is no reaction of the driven resistance upon the engaging-lever V, no mechanism is requisite to hold it and no power is wasted by pressure and sliding of parts on each other in friction.

Springs W, placed around the bolts O, serve by their elasticity to separate the disk D and flange H and the flange M when the coupling is disengaged, and prevent rattling of the parts when loosened. The ends X of the levers N are made heavy, so as to counterbalance the mass, and consequent centrifugal effect of the longer arm of the lever N and the portion of the link R participating in such effect, which would, if unbalanced, at high velocities hinder the disengagement of the coupling if driven by the pulley B, or cause it to engage when not desired to do so if driven by the shaft A.

Having described this invention and the mode of operating the same, what we claim is—

1. In a friction-clutch for transmitting rotary motion, the combination of the sleeve S, links R, angle-levers N, hub G, having a flange, H, and rim J, bolts O, nuts P, and disk D, mounted on the hub C of the pulley B, with the rim L, having the flange M, arranged and constructed to operate substantially as set forth.

2. In a friction-clutch, the combination of the disk D, mounted on the hub C of the pulley B, with the rim L, having the flange M, and hub G, having the flange H and rim J, the bolts O, nuts P, levers N, links R, sleeve S, and springs W, arranged to operate as set forth.

J. ATWOOD WHITE.
JOHN W. MOORE.

Witnesses:
R. S. BENSON,
JOHN SMALL.